United States Patent
Ori et al.

(10) Patent No.: US 6,590,709 B1
(45) Date of Patent: *Jul. 8, 2003

(54) DIFFRACTIVE OPTICAL ELEMENT AND METHOD OF MANUFACTURING A MOLD

(75) Inventors: Yuichiro Ori, Moriyama (JP); Koji Miyai, Sakai (JP); Hiromu Mukai, Kawachinagano (JP); Shigeto Ohmori, Kawachinagano (JP)

(73) Assignee: Minolata Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,531

(22) Filed: Apr. 17, 1998

(30) Foreign Application Priority Data

Apr. 18, 1997 (JP) ............................................. 9-101704

(51) Int. Cl.⁷ ................................................. G02B 5/18
(52) U.S. Cl. ......................... 359/566; 359/15; 359/558; 359/569; 359/571; 359/572; 359/576; 385/31; 385/37
(58) Field of Search .......................... 359/15, 565, 566, 359/569, 571, 572, 574, 575, 576, 558; 385/31, 37

(56) References Cited

U.S. PATENT DOCUMENTS

| | | | | |
|---|---|---|---|---|
| 5,161,059 A | * | 11/1992 | Swanson et al. | 359/565 |
| 5,589,983 A | | 12/1996 | Meyers et al. | 359/566 |
| 5,638,212 A | * | 6/1997 | Meyers et al. | 359/569 |

FOREIGN PATENT DOCUMENTS

JP        A 0161843    *  5/1982    ................. 359/571

* cited by examiner

Primary Examiner—Audrey Chang
Assistant Examiner—Craig Curtis
(74) Attorney, Agent, or Firm—Morrison & Foerster LLP (57) ABSTRACT

A diffractive optical element acts as a lens. The optical element has a diffraction grating. The diffractive grating is provided with a plurality of ridges. Each of the ridges has a transmissive surface. A sectional profile of the transmissive surface is composed of a plurality of successively connected strait lines of an identical length. The length varies from one ridge to another.

10 Claims, 4 Drawing Sheets

DIFFRACTIVE OPTICAL ELEMENT AND METHOD OF MANUFACTURING A MOLD

This application is based on application No. H9-101704 filed in Japan, the content of which is hereby incorporated by reference.

BACKGROUND OF THE INVENTION

1. Field of the Invention

The present invention relates to a method of manufacturing a mold, and more particularly, to a diffractive optical element such as a diffraction lens having on its surface a relief pattern like that of a blazed diffraction grating and a mold manufacturing method suitable for molding the same.

2. Description of the Prior Art

For example, as the taking lens for the single lens camera, a lens is known which uses a diffractive structure for correcting chromatic aberration. In the diffraction lens, as well known, at least one of the opposed surfaces of the lens body is curved in order to form a refractive area having a power, and a diffractive area is provided which has a power to reduce chromatic aberration led by the refractive area.

Normally, an optical element having a diffractive surface configuration typified by the above-described diffraction lens is manufactured by use of a mold for resin. As a method of manufacturing a mold for molding a diffractive optical element, various methods have recently been proposed which use cutting by use of a diamond tipped turning tool, so-called diamond turning. These conventional technologies all use diamond turning operations by linear interpolation in the directions of the Z- and X-axes. As an example thereof, U.S. Pat. No. 5,589,983 discloses a diffractive optical surface configuration manufacturing method where the cutting speed and the number of cutting rotations are clearly taught. This is not a disclosure as to processing conditions under which transmissive surfaces that effect diffraction can be so processed as to be substantially as smooth as a mirror surface depending on cutting conditions.

In processing a mold for molding an optical element having a normal spherical or aspherical curved surface relief configuration, a high-precision diamond tipped turning tool is used in which a point R surface called a corner R is approximately 1 mm in radius. By bringing the point R surface of the diamond tipped turning tool into point contact with work, removal processing of the contact points is performed.

In this case, a necessary curved surface configuration is typically formed by linear interpolation in the Z- and X-axes of the processor, and a desired processing configuration is obtained by controlling the X- and Z-axes of the processor so that the curved surface configuration such as an aspherical surface configuration is the locus of the contact points. However, on the processed surface formed by bringing such a diamond tipped turning tool into point contact with a mold material, a fine pattern is formed which comprises a geometric configuration with a level difference called a sculpture height.

The sculpture height depends on the configuration of the point R surface of the turning tool and the feed amount of the work per operation. That is, the greater the radius of the point R surface of the turning tool is and the smaller the feed amount of the work per operation is, the smaller the sculpture height is. For example, when processing is performed under normal processing conditions by use of a diamond tipped turning tool with a point R surface radius of 1 mm, the sculpture height is sufficiently smaller than that of a surface with a surface roughness of approximately 0.02 to 0.03 micron which is called an optical mirror surface.

Figure 5:
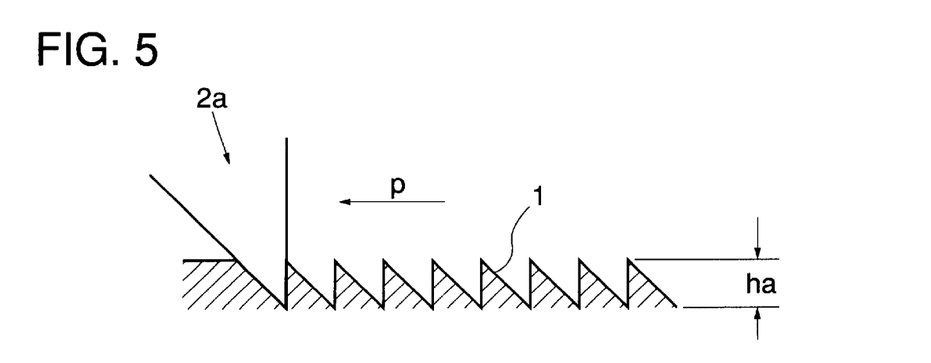
FIG. 5 is a view showing a sculpture height when processing is performed with a turning tool having a small point R surface.

However, when a mold for manufacturing a precision diffractive optical element exhibiting a fine curved surface relief configuration where bumps of approximately 1 micron are continued as shown in FIG. 5 is processed on a work 1, a high-precision diamond tipped turning tool 2a is necessary which has a very small point R surface with a radius of not more than several microns. In FIG. 5, the arrow p represents the feed direction of the turning tool 2a.

However, when a mold is processed by the conventional method by use of the above-described diamond tipped turning tool having an acute point, a high sculpture height is formed on the work surface. In a diffraction lens molded by use of a mold where such a sculpture height h exists, the surface roughness deteriorates to cause light scattering, so that the optical performance deteriorates.

In order that the sculpture height is sufficiently small when the method shown in FIG. 5 is used, it is necessary that the feed amount of the diamond tipped turning tool 2a per rotation should be sufficiently small. However, if the feed amount per rotation is too small, the processing time increases and it is difficult to perform processing with high precision. For this reason, under practical processing conditions, it is necessary to set a certain extent of feed amount, and this makes it impossible to obtain a surface roughness which is no more than that of the optical mirror surface when the conventional processing method is used which uses the diamond tipped turning tool 2a with a point R surface radius of several microns.

Figure 6:
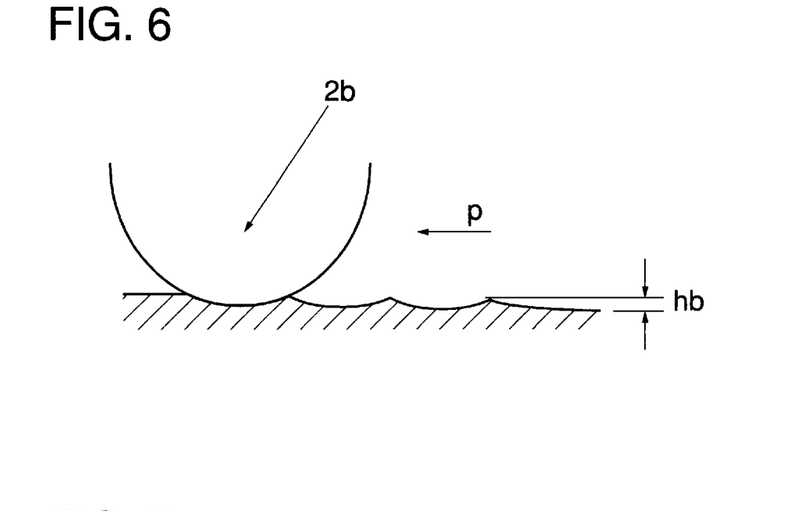
FIG. 6 is a view showing a sculpture height when processing is performed with a turning tool having a large point R surface.

Therefore, as shown in FIG. 6, by using a diamond tipped turning tool 2b in which the radius of the point R surface is great to some extent, the sculpture height sh on the processed surface of the work 1 is reduced and the above-described problem can be solved. However, in this case, another problem arises that the stepped configuration of the diffractive surface of the mold for molding a diffractive optical element cannot be formed with precision.

Figure 7:
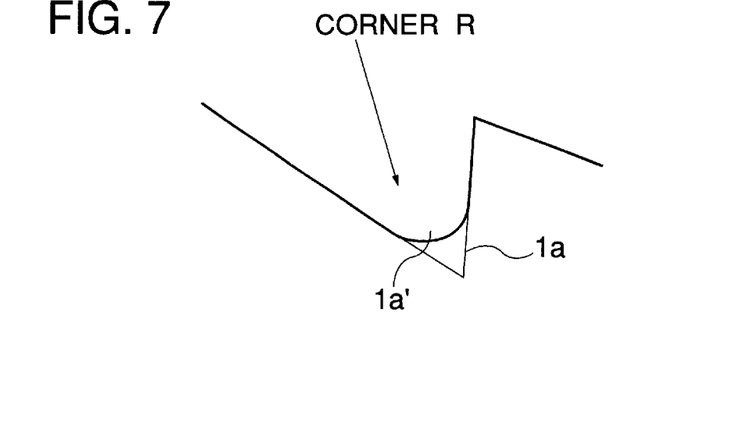
FIG. 7 is an enlarged view showing the configuration of a relevant part of a diffractive optical element when processing is performed with a turning tool having a large point R surface.

That is, as shown in the enlarged view of FIG. 7, when the radius of the point R surface of the diamond tipped turning tool is great, the stepped configuration of the work surface does not have an acute angle as shown by the thick solid line 1a'. The thin solid line 1a represents a stepped configuration of the diffractive surface which is to be realized. Thus, by a method which uses the diamond tipped turning tool 2b having an increased point R surface radius, although the optical performance deterioration due to the light scattering of the molded diffractive optical element is reduced, the point R surface configuration of the diamond tipped turning tool 2b cannot be prevented from remaining at the corner of the diffraction grating.

Since the configuration is transferred to the actual lenses, a great R surface is formed on a corner portion of the diffractive optical surface of the lens and the light incident on the portion does not contribute to the diffraction but becomes zero-order light, so that a needless ghost image appears and the diffraction efficiency deteriorates. As a result, the optical performance is degraded.

SUMMARY OF THE INVENTION

An object of the present invention is to provide a method of manufacturing a mold having a micron-order fine diffractive configuration and being excellent in surface precision by paying attention to a turning tool configuration with which a stepped configuration of a diffractive surface can be processed and to a diffraction grating transmissive surface curvature radius and a grating pitch which are particular to a diffractive surface that acts as a lens, and to provide a diffractive optical element with excellent performance by the method.

To achieve the above object, according to one aspect of the present invention, a diffractive optical element that acts as a lens is provided with a diffraction grating having a plurality of ring-shaped ridges, each of the ridges having a transmissive surface whose sectional profile is composed of a plurality of successively connected straight lines of an identical length, the length varying from one ridge to another.

According to another aspect of the present invention, a diffractive optical element that acts as a lens is provided with a diffraction grating having a plurality of ring-shaped ridges, each of the ridges having a transmissive surface whose sectional profile is composed of a plurality of successively connected arcs of an identical radius. In this diffractive optical element, the number of the arcs composing the sectional profile of the transmissive surface of one ridge depends on the radius of those arcs, on a radius of curvature of the sectional profile of the transmissive surface as determined by a phase function, and on a grating pitch and a grating height at that ridge.

According to still another aspect of the present invention, in a method for manufacturing a mold for molding a resin-molded product that has on its surface fine ridges and grooves of which at least one has a sectional profile composed of a plurality of straight lines having different inclinations, the mold being processed by turning by use of a turning tool that has, at its point, a surface whose sectional profile describes an arc of a radius of a few microns and, continuously at both ends of this surface, surfaces whose sectional profiles are linear, those molding surfaces of the mold which are used to form a ridge or groove of the resin-molded product that has a sectional profile composed of a plurality of straight lines having different inclinations are formed by processing those molding surfaces by turning by use of the surfaces having linear sectional profiles of the turning tool, with the turning tool held at a different angle for each of the molding surfaces to be formed.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, an embodiment of the present invention will be described with reference to the drawings. The cross-sectional configuration, with the optical axis of the diffractive surface as the center, of a diffractive optical element which acts as a lens by being provided with a diffraction grating of a relief configuration is expressed as follows: First, when the phase function is v and the grating height is h, $$\psi(X)=2\pi/\lambda \Sigma c_i h^{2i} h=\lambda/(n-1)$$

where $C_i$ is a phase coefficient, i is 1, 2, . . . , $\lambda$ is a design wavelength, X is the distance from the optical axis center, and n is the refractive index.

Figure 8:
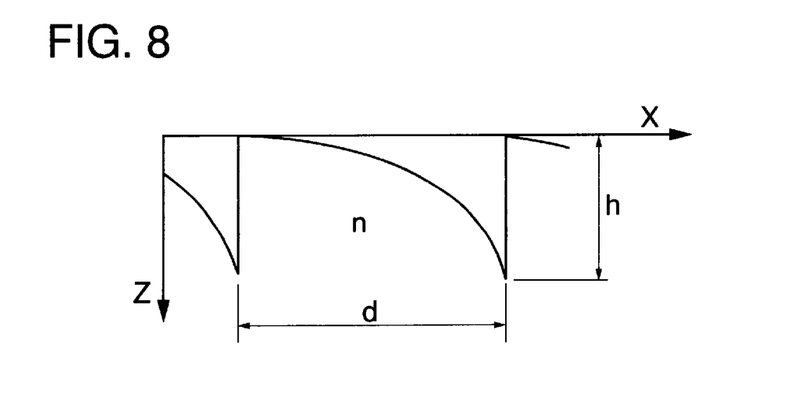
FIG. 8 is a schematic view showing the configuration of the transmissive surface of an ith grating counted from the center.

The configuration of the transmissive surface of an ith grating counted from the center is expressed as shown in FIG. 8. The condition with respect to X is $$-(I-1)<1/\lambda \Sigma c_i X^{2i} \leq -I.$$

The configuration of the transmissive surface is expressed as $$Z=h\times\{1/\lambda \Sigma c_i X^{2i}+(I-1)\}.$$

When the grating pitch is d, $$d \approx -2\pi/(d\psi/dX).$$

Two methods of forming such a cross-sectional configuration will be described hereinafter.

FIRST METHOD

Processing Using Point Contact of the Turning Tool Point

In this method, in order to form the stepped configuration with precision, it is necessary for the radius R of the turning tool point to be sufficiently small. Moreover, since the radius R is small, it is necessary to give consideration to the sculpture height. The concept of a processing profile will be described below.

Figure 9:
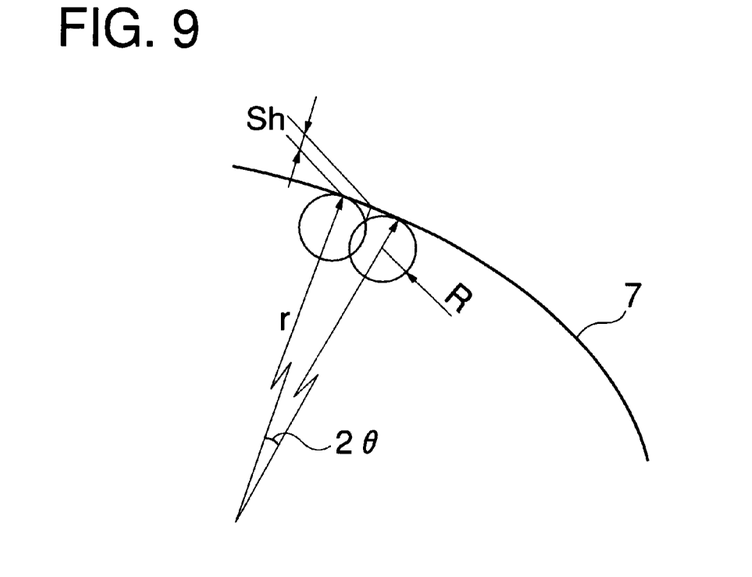
FIG. 9 is an explanatory view showing the principle of processing using point contact of the turning tool point.

As shown in FIG. 9, when the radius of curvature of the cross-sectional configuration of a diffraction grating transmissive surface is r, the relationship with a sculpture height sh is expressed as follows:

$$sh=r-(r-R)\cos\theta-\sqrt{R-(r-R)^2\sin^2\theta} \approx R-\sqrt{R^2-(R\theta)^2(1-R/r)^2}$$

Therefore, the processing point pitch for a predetermined sculpture height is expressed as follows:

$$(R\theta)=\sqrt{sh(2R-sh)}/(1-R/r)$$

Here, the predetermined sculpture height is approximately that of a surface roughness (0.02 to 0.03 $\mu$m) which is called the optical mirror surface.

The curved portion of a grating transmissive surface configuration 7 of FIG. 9 is expressed by connecting a multiplicity of processing points. The number N of processing points of the curved portion of the grating transmissive surface configuration 7 is expressed as follows:

$$N=[\sqrt{h^2+d^2}/\sqrt{sh(2R-sh)}]\,(1-R/r)+1$$

Here, since the grating pitch and the radius of curvature of the transmissive surface vary among the grating numbers, the necessary number of processing points, X-axis direction feed amount and Z-axis direction feed amount vary among grating numbers. A concrete example is shown below.

Design wavelength $\lambda$=546 nm

Phase coefficient $c_1$=−4.2785−3, $c_i$=0 (i≧2)

Refractive index n=1.49329 (PMMA, acrylic resin)

Radius of curvature r=2$c_1$/(n−1)=57.6475 mm

Turning tool point radius R=0.5 $\mu$m

Processing point interval i=√(2R−sh)sh/(1−R/r)

At this time, if the sculpture height sh=0.03 $\mu$m, then i=0.17 $\mu$m.

Processing data for each grating number are shown in Table 1. In the table, X amount and Z amount are abbreviations of the X-axis direction feed amount and the Z-axis direction feed amount, respectively.

By fulfilling the above-mentioned condition, in the diamond tipped turning tool processing of the Z-axis and X-axis control, the stepped configuration of the diffraction grating is accurate, the transmissive surface has necessary smoothness (i.e. is as smooth as a mirror surface) and the number of processing points is sufficient, so that the processing time is short. Moreover, paying attention to the feed amount in the Z-axis direction, variation in Z-axis direction feed amount is 1% when the grating pitch is not more than 20 $\mu$m. From this, it is understood that the locus of the processing points is substantially linear. In the concrete example, the variation in Z-axis direction feed amount is not more than ±1% when the grating pitch is not more than 40 $\mu$m, and there is no influence on the performance of products even if the locus of the processing points is linear.

SECOND METHOD

Processing Using Line Contact of the Turning Tool)

In this case, in order to form the stepped configuration with precision, it is necessary for the radius R of the turning tool point to be sufficiently small. Moreover, although no sculpture height is generated because processing is performed by use of a linear portion of the turning tool edge, a predetermined condition of approximation to a straight line is necessary. Moreover, C-axis control for adjusting the turning tool angle is necessary in addition to the Z-axis and X-axis control with respect to the first method. The concept of a processing profile will be described hereinafter.

Figure 10:
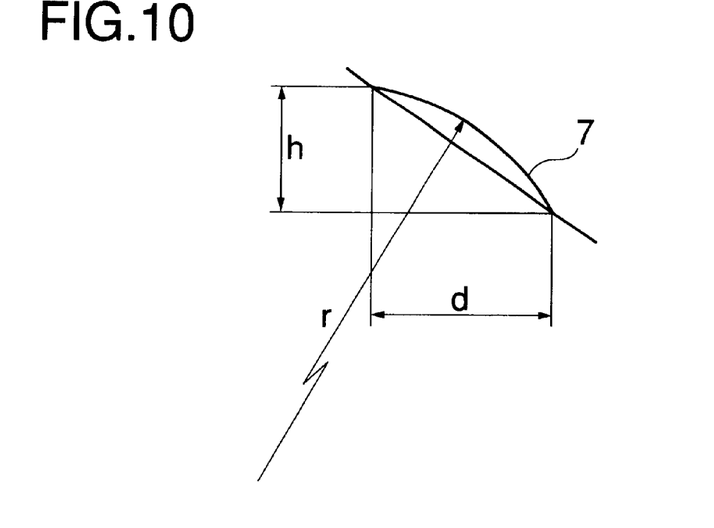
FIG. 10 is an explanatory view showing the principle of processing using line contact of the turning tool.

As shown in FIG. 10, when the radius of curvature of the cross-sectional configuration of a diffraction grating transmissive surface is r and it is assumed that the transmissive surface curve is approximated to one straight line and that the transmissive surface curve is considered as an arc, the distance from the straight line is expressed as follows:

$$r-\sqrt{r^2-(d^2+h^2)/4}$$

A predetermined condition of the approximation to one straight line is shown below. When the transmissive surface is a straight line, the converging capability of the light deteriorates because of reduction in diffraction efficiency. According to an experiment, sufficient converging capability was obtained when the following condition are fulfilled:

(Distance between the curved line and the straight line)= (one-hundredth to four-hundredths the diffraction grating height h).

Therefore, the number N of approximation straight lines which fulfills the predetermined condition of the approximation to one straight line is expressed by the following expression:

$$N=[r-\sqrt{r^2-(d^2+30h^2)/4}]/(h\times 4/100)\sim[r-\sqrt{r^2-(d^2+30h^2)/4}]/(h\times 1/100)$$

Thereby, the curved portion of the grating transmissive surface configuration 7 of FIG. 10 is expressed by connecting a multiplicity of processing line segments, and since the grating pitch varies among positions, the number of necessary line segments, i.e. the number of necessary processing lines varies among positions. A concrete example is shown below.

Design wavelength $\lambda$=546 nm

Phase coefficient $c_1$=−4.2785E−3, $c_i$=0 (i≧2)

Refractive index n=1.49329 (PMMA, acrylic resin)

Grating height h=$\lambda$/(n−1)=1.107 $\mu$m

Radius of curvature r=2$c_1$/(n−1)=57.6475 mm

Processing data for each grating number are shown in Table 2. In Table 2, Number represents the grating number, Radius represents the ring radius, Distance represents the distance between the arc and the cutting straight line, Number of straight lines represents the number of straight lines in the case of one-hundredth the grating height h, and X amount and C rotation are abbreviations of the X-axis direction feed amount and the C-axis direction rotation amount, respectively.

By fulfilling the above-mentioned condition, in the cutting processing of the Z-axis, X-axis and C-axis control, the stepped configuration of the diffraction grating is accurate, there is no sculpture height and the converging capability of the diffracted light is excellent. Moreover, since the number of processing lines is sufficient, the processing time is short. In the concrete example, when the grating pitch is not more than 75 $\mu$m, the cross-sectional configuration of the grating transmissive surface can be formed of one straight line.

The above-described first method is different from the conventional method in cutting condition. However, the conventional method of processing of the two axes, i.e. the X- and Z-axes is used as the manufacturing method. The second method is different from the conventional method in cutting condition and manufacturing method. Hereinafter, a manufacturing method according to the second method will be described. The mold manufacturing method according to the present invention is intended to manufacture a mold for molding a diffractive optical element having fine relief configurations on its surface and in which at least one of the relief configurations is constituted by straight lines having a plurality of inclinations with respect to the optical axis.

Figure 1:
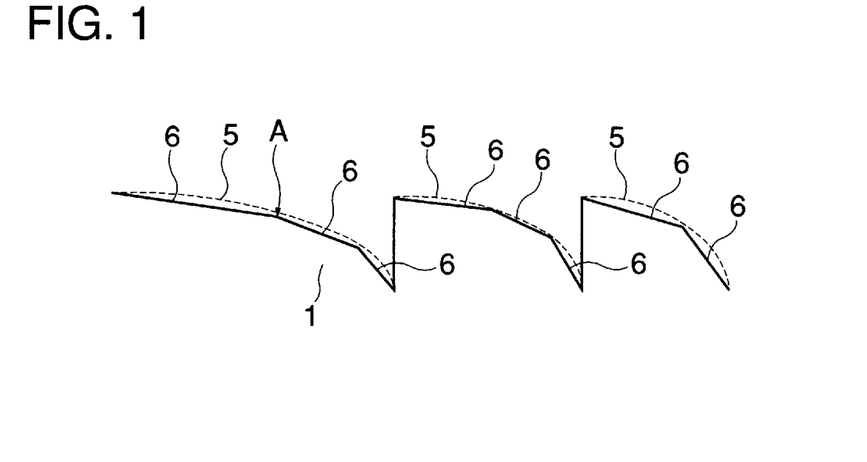
FIG. 1 is a view schematically showing the configuration of a mold manufacturing method according to an embodiment of the present invention.
Figure 2:
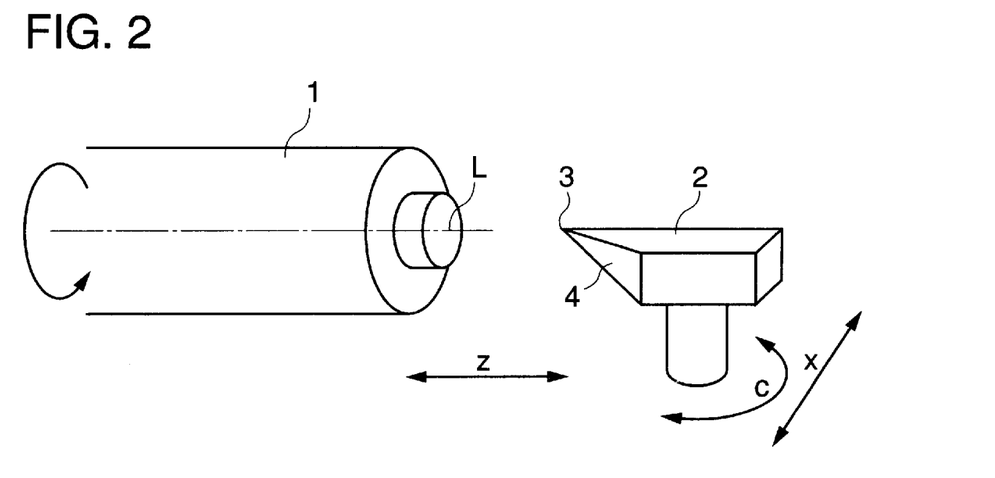
FIG. 2 is a view schematically showing the structure of a processor.

FIG. 1 schematically shows the configuration of the embodiment of the present invention. FIG. 2 schematically shows the structure of a processor used for the mold manufacturing method. In these figures, reference numeral 1 represents a work constituting the mold. During processing, the work 1 is rotated in one direction by a driving portion (not shown) of the processor. The work is made of a material such as one in which electroless Ni plating is applied onto the surface of an iron base material.

The processor has a C-axis for adjusting the angle of the diamond tipped turning tool 2 in addition to the normally-provided X- and Z-axes. The diamond tipped turning tool 2 has a several-micron-order point R surface 3 and a linear surface 4 being continuous with the point R surface 3, and performs cutting processing on the work 1 by operation of the driving portion and a control portion (not shown) of the processor.

In the conventional manufacturing method, a program is configured on the assumption that the diamond tipped turning tool and the work are in point contact with each other. In this embodiment, however, processing is performed with a program configured on an assumption that the diamond tipped turning tool 2 and the work 1 are in surface contact with each other. Specifically, the direction of the cuts is limited to the Z-axis direction. That is, in FIG. 1, the dotted line represents a curved surface relief configuration 5 which is an ideal diffractive surface configuration for the diffractive optical element, whereas the solid line represents one in which the curved surface relief configuration 5 is replaced by a configuration 6 constituted by a plurality of appropriate straight lines for each ring-shaped zone.

A molding surface A corresponding to a relief configuration constituted by the configuration 6 of straight lines having a plurality of inclinations with respect to the optical axis (coinciding with a rotation axis L of the work 1 in FIG. 2) of the diffractive optical element is formed by performing cutting by the linear surface 4 of the diamond tipped turning tool 2 and continuing a plurality of linear portions obtained thereby so as to have different angles.

Figure 3:
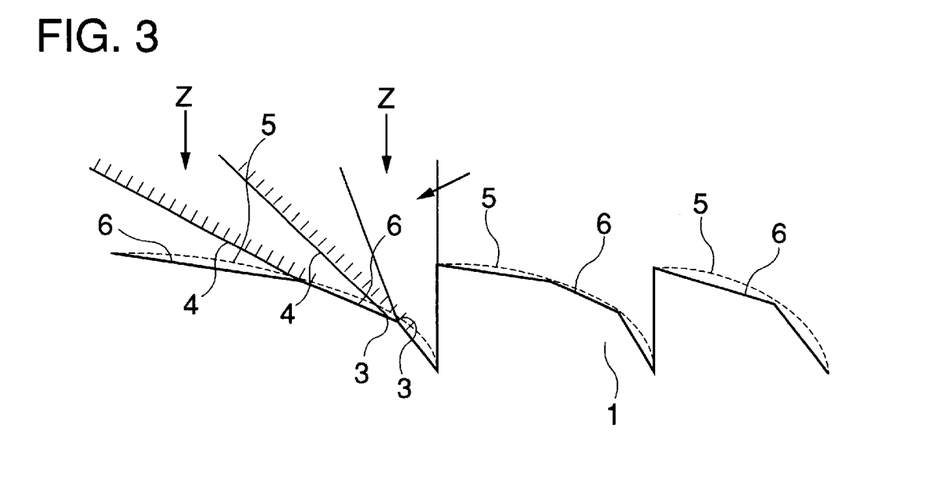
FIG. 3 is a view schematically showing the configuration of cutting by a diamond tipped turning tool.

More specifically, as shown in FIG. 3, the relief configuration of the diffractive optical element formed on the surface of the work 1 is removed by cutting by the linear surface 4 of the diamond tipped turning tool 2. The direction in which the diamond tipped turning tool 2 moves in the cutting of the molding surface A is limited to the Z-axis direction shown by the arrow, i.e. the direction of the processing rotation axis. For this reason, surface roughness is not caused which is due to the sculpture height brought about by the geometric configuration of the point R surface 3 of the diamond tipped turning tool 2.

The configuration 6 of straight lines constituting the molding surface A has a slight error from the ideal curved surface relief configuration 4 as is apparent from FIG. 1. However, although this error becomes a factor deteriorating the diffraction efficiency of the molded diffractive optical element and influences the element performance, the degree of influence is very small and causes no problem in practical use.

During processing, the diamond tipped turning tool 2 is adjusted to a given angle along the C axis and cutting of a given amount is performed along the Z axis. Then, the Z axis is returned and the diamond tipped turning tool 2 is separated from the work 1. Then, the X-axis is moved to a given position and the diamond tipped turning tool 2 is again adjusted to the given angle along the C axis. By repeating this operation, the processing on the work 1 is performed. That is, in a method of connecting short straight line portions to form a curved surface, by uniaxially processing the straight line portions, a configuration approximate to a curved surface can be formed without the sculpture height being formed.

Figure 4:
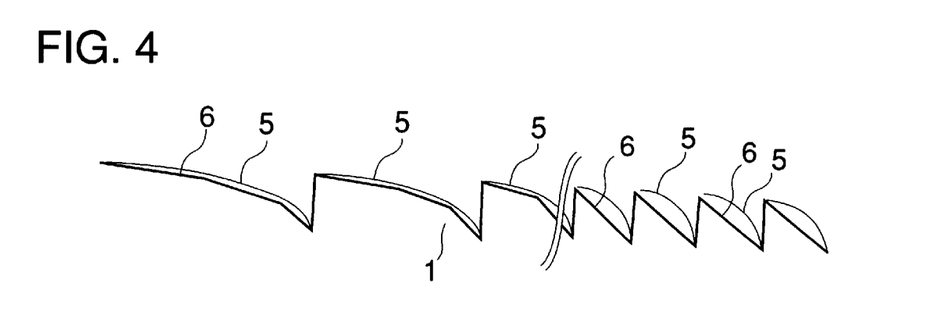
FIG. 4 is a view schematically showing the configuration of a mold corresponding to a central region and a peripheral region with respect to the optical axis of a diffractive optical element.

FIG. 4 shows the configuration of a mold corresponding to a central region and a peripheral region with respect to the optical axis of a diffractive optical element. As described previously, in the cross-sectional configuration of a diffraction grating constituting a diffractive region of a diffractive optical element, the grating pitch in the peripheral region is small compared with that in the central region in the vicinity of the optical axis, and although the oblique sides exhibit an arc surface configuration in the central region, the cross-sectional configuration is close to a right-angled triangle in the peripheral region. That is, in the central region of the diffractive optical element, the curved surface processing portion has a configuration constituted by straight lines connected to each other; however, since the relief pitch in the ring-shaped zones in the peripheral region frequently falls within a range of several tens of microns to several microns, there is hardly any influence on the element performance even though the curved surface relief in the peripheral region is approximated to a straight line.

Thus, in this embodiment, although the curved surface is constituted by a plurality of straight lines 6 in the central region, the diffractive relief configuration is constituted by one straight line 6 in the vicinity of the periphery. By thus performing processing in one cutting, the processing program can be simplified, so that the processing time is reduced.

In this embodiment, the relief configuration is provided on a plane surface which is an end surface of the work 1 as a constituent of the diffractive pattern of a diffractive optical element. However, the present invention is not limited to the relief configuration provided on a plane surface, but may be employed for processing of a configuration provided on a general spherical surface or aspherical configuration.

TABLE 1

| [Grating Number] | [Ring Radius] (mm) | [Grating Pitch] (mm) | [Number of Processing Points] | [X amount] ($\mu$m) | [Z amount] ($\mu$m) |
|---|---|---|---|---|---|
| 1 | 0.357532754 | 0.357256 | 2096 | 0.171 | −0.00106~ 0 |
| 2 | 0.505556237 | 0.147976 | 869 | 0.171 | −0.0015~ −0.00106 |
| 3 | 0.019135198 | 0.113551 | 667 | 0.171 | −0.00183~ −0.0015 |
| 4 | 0.714885071 | 0.09573 | 563 | 0.171 | −0.00212~ −0.00183 |
| 5 | 0.799233496 | 0.084333 | 496 | 0.171 | −0.00236~ −0.00212 |
| 6 | 0.875489103 | 0.076243 | 448 | 0.171 | −0.00259~ −0.00236 |
| 7 | 0.945614765 | 0.070115 | 413 | 0.171 | −0.0028~ −0.00259 |
| 8 | 1.010885003 | 0.065261 | 384 | 0.171 | −0.00299~ −0.0028 |
| 9 | 1.072188152 | 0.061295 | 361 | 0.171 | −0.00317~ −0.00299 |
| 10 | 1.130172443 | 0.057977 | 341 | 0.171 | −0.00334~ −0.00317 |
| ... | ... | ... | ... | ... | ... |
| 95 | 3.482072735 | 0.018375 | 109 | 0.17 | −0.01029~ −0.01023 |
| 96 | 3.500352462 | 0.018279 | 109 | 0.17 | −0.01034~ −0.01029 |
| 97 | 3.518537182 | 0.018184 | 108 | 0.17 | −0.01039~ −0.01034 |
| 98 | 3.536627894 | 0.01809 | 108 | 0.17 | −0.01045~ −0.01039 |
| 99 | 3.554626599 | 0.017998 | 107 | 0.17 | −0.0105~ −0.01045 |
| 100 | 3.572535297 | 0.017908 | 107 | 0.17 | −0.01055~ −0.0105 |

TABLE 2

| [No.] | [Radius] (mm) | [Grating Pitch] (mm) | [Distance] (μm) | [Number of Straight Lines] | [X amount] (μm) | [C rotation] (rad) |
|---|---|---|---|---|---|---|
| 1 | 0.357533 | 0.357256 | 0.277 | 26 | 13.7 | −0.006~0 |
| 2 | 0.505556 | 0.147976 | 0.047 | 5 | 29.6 | −0.009~0.006 |
| 3 | 0.619135 | 0.113551 | 0.028 | 3 | 37.9 | −0.011~0.009 |
| 4 | 0.714885 | 0.09573 | 0.02 | 2 | 47.9 | −0.012~0.011 |
| 5 | 0.799233 | 0.084333 | 0.015 | 2 | 42.2 | −0.014~0.012 |
| 6 | 0.875489 | 0.076243 | 0.013 | 2 | 38.1 | −0.015~0.014 |
| 7 | 0.945615 | 0.070115 | 0.011 | 1 | 0 | −0.016~0.015 |
| 8 | 1.010885 | 0.065261 | 0.009 | 1 | 0 | −0.018~0.016 |
| 9 | 1.072188 | 0.061295 | 0.008 | 1 | 0 | −0.019~0.018 |
| 10 | 1.130172 | 0.057977 | 0.007 | 1 | 0 | −0.02~0.019 |
| ... | ... | ... | ... | ... | ... | ... |
| 95 | 3.482073 | 0.018375 | 0.001 | 1 | 0 | −0.06~−0.06 |
| 96 | 3.500352 | 0.018279 | 0.001 | 1 | 0 | −0.061~0.06 |
| 97 | 3.518537 | 0.018184 | 0.001 | 1 | 0 | −0.061~0.061 |
| 98 | 3.536628 | 0.01809 | 0.001 | 1 | 0 | −0.061~0.061 |
| 99 | 3.554627 | 0.017998 | 0.001 | 1 | 0 | −0.062~0.061 |
| 100 | 3.572535 | 0.017908 | 0.001 | 1 | 0 | −0.062~0.062 |

What is claimed is:

1. A diffractive optical element which acts as a lens, comprising a multi-dimensional diffraction grating having a plurality of ring-shaped ridges, each of said plurality of ridges having a transmissive surface whose sectional profile comprises a plurality of successively connected line segments having varying lengths and inclinations, and the line segments of at least two sectional profiles having differing lengths and inclinations, wherein the number of said line segments comprising the sectional profile of the transmissive surface of one ridge fulfills the following condition:

$$[r-\sqrt{r^2-(d^2+h^2)/4}]/(h \times 4/100) \leq N \leq [r-\sqrt{r^2-(d^2+h^2)/4}]/(h \times 1/100)$$

where

N represents the number of straight lines composing the sectional profile of the transmissive surface of the ridge;

d represents the grating pitch at that ridge;

h represents the grating height at that ridge; and r represents the radius of curvature of the curved line determined by the phase function.

2. A diffractive optical element as claimed in claim 1, wherein the number of said line segments comprising the sectional profile of the transmissive surface of one ridge depends on a radius of curvature of a curved line determined by a phase function and on a grating pitch and a grating height at that ridge.

3. A diffractive optical element as claimed in claim 1, wherein the number of said line segments comprising the sectional profile of the transmissive surface of a ridge in a peripheral region of said diffractive optical element equals one.

4. A diffractive optical element as claimed in claim 1, wherein the number of said line segments comprising the sectional profile of the transmissive surface of one ridge equals one when the following condition is fulfilled:

$$d \leq 75 \, \mu m$$

where d represents the grating pitch at that ridge.

5. A diffractive optical element which acts as a lens, comprising a multi-dimensional diffraction grating having a plurality of ring-shaped ridges, each of said plurality of ridges having a transmissive surface whose sectional profile comprises a plurality of successively connected arcs of an identical radius and varying inclinations, and the arcs of at least two sectional profiles having differing inclinations, wherein the number of said arcs comprising the sectional profile of the transmissive surface of one ridge depends on the radii of said arcs, on a radius of curvature of the sectional profile of the transmissive surface as determined by a phase function, and on a grating pitch and a grating height at said ridge, and the number of points at which the sectional profile of the transmissive surface of one ridge needs to be processed by turning is determined by the following formula:

$$N = [\sqrt{(h^2+d^2)}/\sqrt{sh(2R-sh)}](1-R/r)+1$$

where

N represents the number of points at which the sectional profile of the transmissive surface of the ridge needs to be processed;

d represents the grating pitch at that ridge;

h represents the grating height at that ridge;

r represents the radius of curvature of the sectional profile of the transmissive surface;

R represents the radius of the arcs (i.e. the radius of a point of a turning tool with which the sectional profile of the transmissive surface is processed); and sh represents a sculpture height.

6. A diffractive optical element as claimed in claim 5, wherein said successively connected arcs of an identical radius comprising the sectional profile of the transmissive surface of one ridge exhibit a substantially linear locus in a peripheral region of said diffractive optical element.

7. A diffractive optical element as claimed in claim 5, wherein said successively connected arcs of an identical radius comprising the sectional profile of the transmissive surface of one ridge exhibit a substantially linear locus when the following condition is fulfilled:

$$d \leq 40 \, \mu m$$

where d represents the grating pitch at that ridge.

8. A method for manufacturing a mold for molding a resin-molded product which has on its surface fine ridges and grooves of which at least one of the ridges and grooves has a sectional profile comprising a plurality of line segments having different inclinations, the line segments of at least two sectional profiles having differing inclinations, said mold being processed by a turning tool which has, at its point, a surface whose sectional profile describes an arc of a radius of a few microns and, continuously at both ends of this surface, surfaces whose sectional profiles are linear, wherein those molding surfaces of said mold which are used to form a ridge or groove of said resin-molded product which has a sectional profile comprising the plurality of line segments having different inclinations are formed by processing those molding surfaces by turning said surfaces having linear sectional profiles of said turning tool, which is held at a different angle for each of the molding surfaces to be formed, wherein the number of said line segments comprising the sectional profile of the transmissive surface of one ridge fulfills the following condition:

$$[r-\sqrt{r^2-(d^2+h^2)/4}]/(h\times 4/100) \leq N \leq [r-\sqrt{r^2-(d^2+h^2)/4}]/(h\times 1/100)$$

where

N represent the number of straight lines composing the sectional profile of the transmissive surface of the ridge;

d represents the grating pitch at that ridge;

h represents the grating height at that ridge; and r represents the radius of curvature of the curved line determined by the phase function.

9. A method for manufacturing a mold as claimed in claim 8, wherein, while one of the molding surfaces of said mold that are used to form the ridge or groove of said resin-molded product that has a sectional profile comprising of a plurality of line segments having different inclinations is processed by use of said turning tool, said turning tool is fed only in a direction parallel to an axis of rotation of turning.

10. A method for manufacturing a mold as claimed in claim 8, wherein said resin-molded product is a diffractive optical element that has smaller grating pitches in its peripheral region than in its central region around an optical axis and that has, in said peripheral region, ridges of which each has a sectional profile composed of a single line, and wherein molding surfaces in a peripheral region of said mold that are used to form the ridges in said peripheral region of said resin-molded product are each formed by turning so as to have a linear sectional profile by use of said surfaces having linear sectional profiles of said turning tool.

* * * * *

UNITED STATES PATENT AND TRADEMARK OFFICE
CERTIFICATE OF CORRECTION

PATENT NO. : 6,590,709 B1
DATED : July 8, 2003
INVENTOR(S) : Yuichiro Ori et al.

It is certified that error appears in the above-identified patent and that said Letters Patent is hereby corrected as shown below:

Title page,
Item [73], Assignee, please change "Minolata" to -- Minolta --.

Column 11,
Line 12, change " $\sqrt{r^{2-(d^2+h^2)/4}}$ ]" to -- $\sqrt{r^2-(d^2+h^2)/4}$ ] --

Column 12,
Lines 3-4, change "comprising" to -- comprised --;
Line 15, change "composed" to -- comprised --.

Signed and Sealed this

Thirtieth Day of December, 2003

JAMES E. ROGAN
*Director of the United States Patent and Trademark Office*